United States Patent
Talluri et al.

(10) Patent No.: US 6,393,056 B1
(45) Date of Patent: May 21, 2002

(54) COMPRESSION OF INFORMATION FROM ONE DETECTOR AS A FUNCTION OF INFORMATION FROM ANOTHER DETECTOR

(75) Inventors: Rajendra K. Talluri, Plano; David Harold Bartley, Dallas, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/338,026

(22) Filed: Jun. 22, 1999

Related U.S. Application Data

(60) Provisional application No. 60/091,408, filed on Jul. 1, 1998.

(51) Int. Cl.$^7$ .................................................. H04B 1/66
(52) U.S. Cl. ...................................................... 375/240
(58) Field of Search ................................. 348/143, 144, 348/145, 150, 151, 152, 153, 159, 160, 169, 170, 164, 163, 333.01, 333.02, 333.03, 372, 208; 320/127–133, 135–136; 396/51; 375/240; H04N 5/225

(56) References Cited

U.S. PATENT DOCUMENTS

| | | | | |
|---|---|---|---|---|
| 4,737,847 A | * | 4/1988 | Araki et al. ................. | 358/108 |
| 4,943,854 A | | 7/1990 | Shiota et al. ................ | 358/108 |
| 5,111,291 A | | 5/1992 | Erickson et al. ............ | 358/408 |
| 5,392,223 A | * | 2/1995 | Caci ............................ | 364/514 |
| 5,473,370 A | * | 12/1995 | Moronaga et al. .......... | 348/231 |
| 5,491,511 A | | 2/1996 | Odle ............................ | 349/153 |
| 5,521,634 A | * | 5/1996 | McGary ...................... | 348/169 |
| 5,606,390 A | * | 2/1997 | Arai et al. ................... | 396/51 |
| 5,969,755 A | * | 10/1999 | Courtney .................... | 348/143 |
| 5,977,976 A | * | 11/1999 | Maeda ........................ | 345/353 |
| 6,091,767 A | * | 7/2000 | Westerman ................. | 375/240 |
| 6,097,429 A | * | 8/2000 | Seeley et al. ................ | 348/154 |
| 6,111,609 A | * | 8/2000 | Stevens ....................... | 348/372 |
| 6,120,461 A | * | 9/2000 | Smyth ......................... | 600/558 |
| 6,141,434 A | * | 10/2000 | Christinan et al. .......... | 382/103 |
| 6,246,382 B1 | * | 6/2001 | MaguiRe, Jr. ................ | 345/8 |
| 6,252,989 B1 | * | 6/2001 | Geisler et al. ............... | 382/232 |

OTHER PUBLICATIONS

Patent Application S.N. 08/795,423, filed Feb. 5, 1997 (TI–21441) (not included).

Patent Application S.N. 08/866,789, filed May 30, 1997 (TI–22548) (not included).

Courtney, Jonathan D., *Automatic Video Indexing via Object Motion Analysis*, Pattern Recognition, Apr. 1997, cover page and pp. 1–31.

Niyogi, et al., *Analyzing and Recognizing Walking Figures in XYT*, 1994 IEEE, pp. 469–474.

(List continued on next page.)

*Primary Examiner*—Chris Kelley
*Assistant Examiner*—Tung Vo
(74) *Attorney, Agent, or Firm*—Robert D. Marshall, Jr.; W. James Brady, III; Frederick J. Telecky, Jr.

(57) ABSTRACT

A system (10) for compressing video information includes an image detector (12) generating image information regarding a selected scene, a supplemental detector (13, 113, 213) generating supplemental information regarding the scene which is different from the image information, and a processing section (19, 119, 219). The processing section generates compressed information by processing the image information as a function of the supplemental information. The processing section may store the compressed information in a storage section (21), or may transmit the compressed information to a remote device through a communication link (26). The image detector may generate video images of the scene in response to visible light. The supplemental detector may generate images of the scene which represent heat or distance, or may determine the portion of the scene to which an eye (214) of an operator is directed.

2 Claims, 3 Drawing Sheets

OTHER PUBLICATIONS

Wren, et al., *Pfinder: Real–Time Tracking of the Human Body*, MIT Media Lab Perceptual Computing Section Technical Report No. 353, published in SPIE 1995, vol. 2615, pp. 1–9.

Turk, et al., *Eigenfaces for Recognition*, 1991 Mass. Institute of Technology, Journal of Cognitive Neuroscience, vol. 3, No. 1, pp. 71–86.

Flinchbaugh, Bruce, et al., *Autonomous Scene Monitoring System*, pp. 205–209.

Norris, et al., *Algorithmic Surveillance—The Future of Automated Visual Surveillance*, CCTV, Surveillance and Social Control Conf., Jul. 9, 1996, pp. 1–21.

Courtney, Jonathan D., *Automatic Object–Based Indexing for Assisted Analysis of Video Data*, 1995, pp. 1–25.

Flinchbaugh, Bruce, *Robust Video Motion Detection and Event Recognition*, May 11, 1997, pp. 51–54.

Rao, Kashipati, *A Computer System to Detect 3–D Rectangular Solids*, 6 unnumbered pages.

Jain, et al., *Segmentation Through the Detection of Changes Due to Motion*, Computer Graphics and Image Processing 11, 1979, pp. 13–34.

*DTS–1000 DTS–1000VB Video Motion Detection & Tracking System*, Steller Security Products Incorporated, 4 unnumbered pages, 1995.

Olson, et al., *Moving Object Detection and Event Recognition Algorithms for Smart Cameras*, May 11, 1997, pp. 159–175.

* cited by examiner

COMPRESSION OF INFORMATION FROM ONE DETECTOR AS A FUNCTION OF INFORMATION FROM ANOTHER DETECTOR

This application claims priority under 35 USC §119(e)(1) of Provisional Application No. 60/091,408, filed Jul. 1, 1998.

TECHNICAL FIELD OF THE INVENTION

This invention relates in general to compression techniques and, more particularly, to techniques for efficiently compressing image information on a real-time basis.

BACKGROUND OF THE INVENTION

A substantial amount of information is required to digitally define a single two-dimensional image, such as a photograph or a video image. Such an image is typically represented in the form of an array of several thousand pixels, each of which requires a certain amount of associated information to set forth a gray scale or color value for that pixel. In a video context, where there is a sequence of successive images, the amount of information required to represent the entire sequence can be enormous.

A first issue relates to situations where video information is to be stored. The amount of storage space needed corresponds directly to the amount of information which must be stored and, as mentioned above, the amount of information can be enormous. A second issue relates to situations where video information must be transmitted to a remote location. Each type of communication link, such as a telephone line or a radio channel, has limits on the amount of information that can be transmitted therethrough within a specified interval of time. In a real-time application, the amount of video information may exceed these limits. It is therefore desirable to compress video information, both to reduce the amount of storage space that would be needed to save the video information, and also to reduce the amount of information that would have to be transmitted through a communication link during a given interval of time.

Various techniques for video compression have already been developed. For example, one known technique is time lapse recording, which involves temporal sampling. In particular, selected images are saved, and other images are discarded. For example, every tenth image may be saved, and other images discarded. A different known approach involves spatial sampling, where each image is subsampled in order to reduce the number of pixels, and thus reduce the amount of overall information. In many applications, only a portion of an image is of primary interest, and other portions are of secondary interest. However, these known techniques of temporal and/or spatial sampling involve a uniform loss of resolution in time or space throughout the image information.

Other techniques have been developed to try to effect compression in a non-uniform manner within a given image, in particular by saving more information as to portions of the image which are of interest, and less information as to portions of the image which are of less interest. However, in order to determine which portion of an image is of greatest interest, these techniques typically use automated analysis of the image itself, and this approach sometimes is gives priority to a portion of the image which is not of primary interest.

Thus various techniques of video compression have already been developed, and have been generally adequate for their intended purposes. However, they have not been satisfactory in all respects.

SUMMARY OF THE INVENTION

From the foregoing, it may be appreciated that a need has arisen for a method and apparatus for effecting compression of image information in an efficient manner on a real-time basis, with the capability to reliably identify portions of an image which are of primary interest and which can be given priority for purposes of compression. According to the present invention, a method and apparatus are provided to address this need, and involve generating image information regarding a selected scene using an image detector, generating supplemental information regarding the selected scene using a supplemental detector, and generating compressed information by processing the image information as a function of the supplemental information, the supplemental information being different from the image information.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
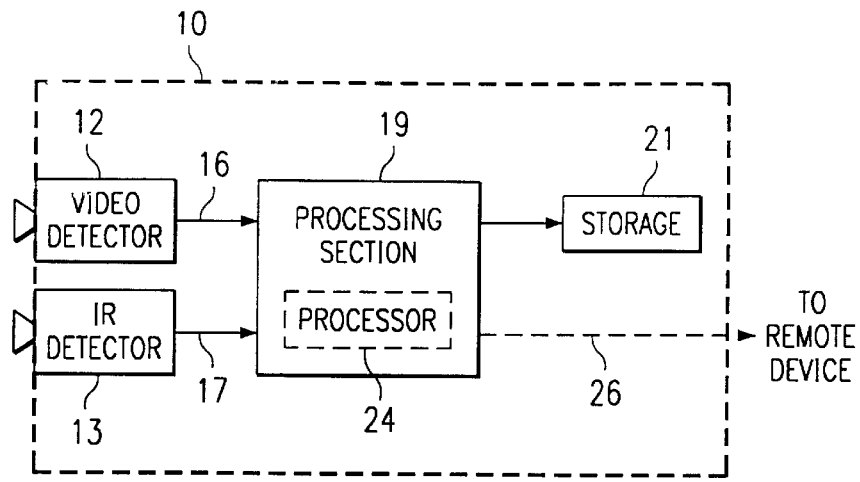
FIG. 1 is a diagrammatic view of a system which embodies the present invention and which effects compression of image information.

FIG. 1 is a diagrammatic view of a system 10 which embodies the present invention, and which can effect compression of image information. The system 10 includes two image detectors 12 and 13, which are respectively coupled at 16 and 17 to a processing section 19, which in turn is coupled to a storage section 21. The processing section 19 can also be coupled to a remote device or computer, as indicated diagrammatically in FIG. 1 by the broken line 26, and as discussed later.

In the embodiment of FIG. 1, the image detector 12 detects and outputs a succession of two-dimensional video images of a selected scene. The video images from the image detector 12 are gray-scale images, but the image detector 12 could alternatively produce color images. In the embodiment of FIG. 1, the image detector 13 detects and outputs two-dimensional infrared images. The image detector 12 is thus responsive to radiation in the visible spectrum, whereas the image detector 13 is responsive to radiation in the infrared spectrum. The image detectors 12 and 13 are aligned with respect to each other, so that an image from one can be effectively overlaid on a concurrent image from the other.

For convenience, it is assumed here that the video images from the detector 12 have the same number of pixels as the infrared images from the detector 13, such that there is a one-to-one correspondence between the pixels of the video images and the pixels of the infrared images.

However, it will be recognized that a one-to-one correspondence is not needed. For example, each infrared image could have one-fourth as many pixels as a video image, such that each pixel of an infrared image corresponds to four pixels of a video image.

The processing section 19 (FIG. 1) includes a processor 24, which is a known microprocessor or microcontroller. For example, the processor 24 may be an X86-compatible processor, or a digital signal processor. The storage section 21 may include a magnetic tape, for example within a tape cassette for a video cassette recorder (VCR). Alternatively, the storage section 21 could be a memory such as a hard disk drive, a flash memory, or a battery backed-up volatile memory.

In FIG. 1, the system 10 is a portable video camera, and the storage section 21 includes a magnetic tape in a VCR cassette. However, the system 10 could have a different configuration. For example, the image detector 12 could be a standalone video camera which is fixedly installed, the image detector 13 could be a known infrared detector which is fixedly installed, and the processing section 19 and storage section 21 could be portions of a known personal computer.

As described in more detail below, the system 10 takes video image information from the image detector 12, processes it in the processing section 19 as a function of supplemental information in the form of infrared image information from the image detector 13, and thereby obtains compressed image information which it saves in the storage section 21. However, even though the system 10 happens to store the compressed image information in the storage section 21, the compressed image information could alternatively be transmitted to a remote device or computer for display, storage, or processing, as indicated diagrammatically in FIG. 1 by the broken line 26.

Figure 2:
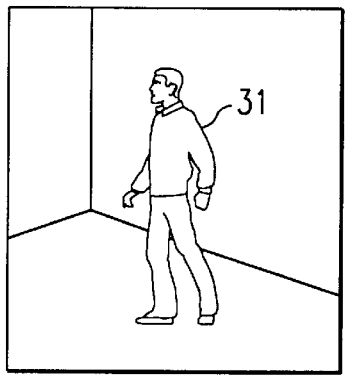
FIG. 2 is a diagrammatic view of a two-dimensional image obtained from an image detector which is a component of the system of FIG. 1.

The manner in which the processing section 19 effects compression of video information from the image detector 12 will now be described in more detail with reference to FIGS. 2–4. More specifically, FIG. 2 is a diagrammatic view of an example of a video image produced by the image detector 12 when the image detectors 12 and 13 are directed toward an area which has arbitrarily been selected to be the corner of a room. A person 31 is presently standing in the corner of the room, and is thus within the field of view of each of the detectors 12 and 13.

The infrared image detector 13 will be producing a succession of infrared images, where each pixel represents a detected temperature from the observed scene. Since the person 31 effectively represents a heat source, an infrared image from the image detector 13 will have a portion which corresponds to the person 31. In this portion of the image, the pixels will indicate a higher temperature than the pixels for other portions of the overall infrared image.

The processing section 19 takes an infrared image which the image detector 13 generated at approximately the same time that the image detector 12 generated the video image of FIG. 2, and thresholds this infrared image. In other words, the value for each pixel in the infrared image is compared to a common predetermined threshold value, and is then set to be either on or off (black or white), depending on whether the pixel value is above or below the threshold value. The resulting threshold image is shown in FIG. 3. Each pixel in the threshold image can be represented by either a binary "1" or a binary "0", depending on whether the pixel is considered to be on or off.

Figure 3:
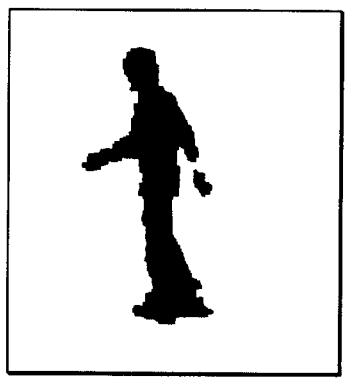
FIG. 3 is a diagrammatic view of a two-dimensional threshold image obtained by processing an image from an infrared detector which is a component of the embodiment of FIG. 1.
Figure 4:
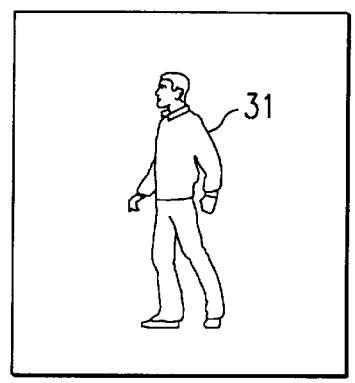
FIG. 4 is a diagrammatic view of a two-dimensional image which is generated in the system of FIG. 1 by processing the image of FIG. 2 using the image of FIG. 3.

The processing section 19 then uses the thresholded infrared image of FIG. 3 as a mask for the unprocessed video image of FIG. 2. In effect, this will extract one or more portions of the video image of FIG. 2, which correspond to regions of elevated temperature. In the illustrated example, the person 31 represents the only region of increased temperature. Thus, the portion of the video image of FIG. 2 which is extracted is the portion corresponding to the person 31. More specifically, the extracted portion 31 of the video image is shown in FIG. 4. The processing section 19 then stores only the extracted portion, which corresponds to the person 31, in the storage section 21. It should be self-evident that the entire video image of FIG. 2 would require substantially more storage space than just the portion 31 of that image. Accordingly, compression is realized by saving only the portion 31 of the overall video image produced by the image detector 12.

In certain applications, for example a security and surveillance application, the background information in the scene which is being monitored is of little or no interest, because the primary focus is the presence and activity of a person or an animal. In such an application, the system 10 of FIG. 1 provides highly accurate and effective compression of the video information from the image detector 12, based on supplemental information obtained from the infrared image detector 13.

Figure 5:
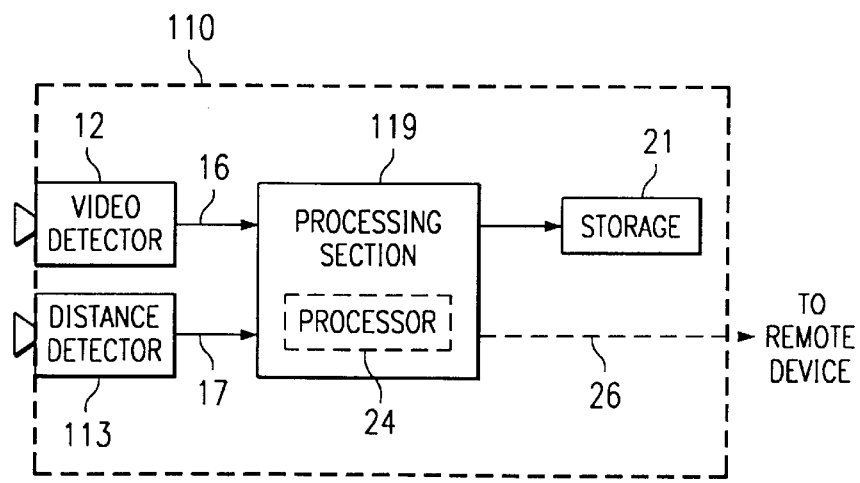
FIG. 5 is a diagrammatic view of a further system which is an alternative embodiment of the system of FIG. 1.

FIG. 5 is a diagrammatic view of a system 110 which embodies the present invention, and which is a variation of the system 10 of FIG. 1. Elements in the system 110 which are identical to elements in the system 10 are identified with the same reference numerals, and are not discussed in detail here. The following discussion focuses on differences between the systems 10 and 110.

More specifically, in the system 110 of FIG. 5, the infrared image detector 13 of FIG. 1 has been replaced with an image detector 113 of a different type. The image detector 113 produces a two-dimensional image of distance information. In particular, each pixel in each image from the image detector 113 has a value which represents the distance from the image detector 113 to a corresponding physical point in the observed scene. It is assumed here that the video images from the detector 12 have the same number of pixels as the distance images from the detector 113, but it will be recognized that a one-to-one correspondence is not needed. One known image detector for providing such a distance image operates optically. In particular, it adjusts optical elements which image visible light onto a detector, so as to vary the focus, and then it evaluates when portions of the resulting image are in and out of focus in order to determine distances from the detector to respective physical points in the observed scene.

The system 110 includes a processing section 119, which differs from the processing section 19 of FIG. 1 in terms of how it generates compressed information by processing video information from the image detector 12 using supplemental information from the image detector 113. The operation of the processing section 119 is described in more detail with reference to FIG. 6, which is a high-level flowchart depicting the operation of the processing section 119.

Figure 6:
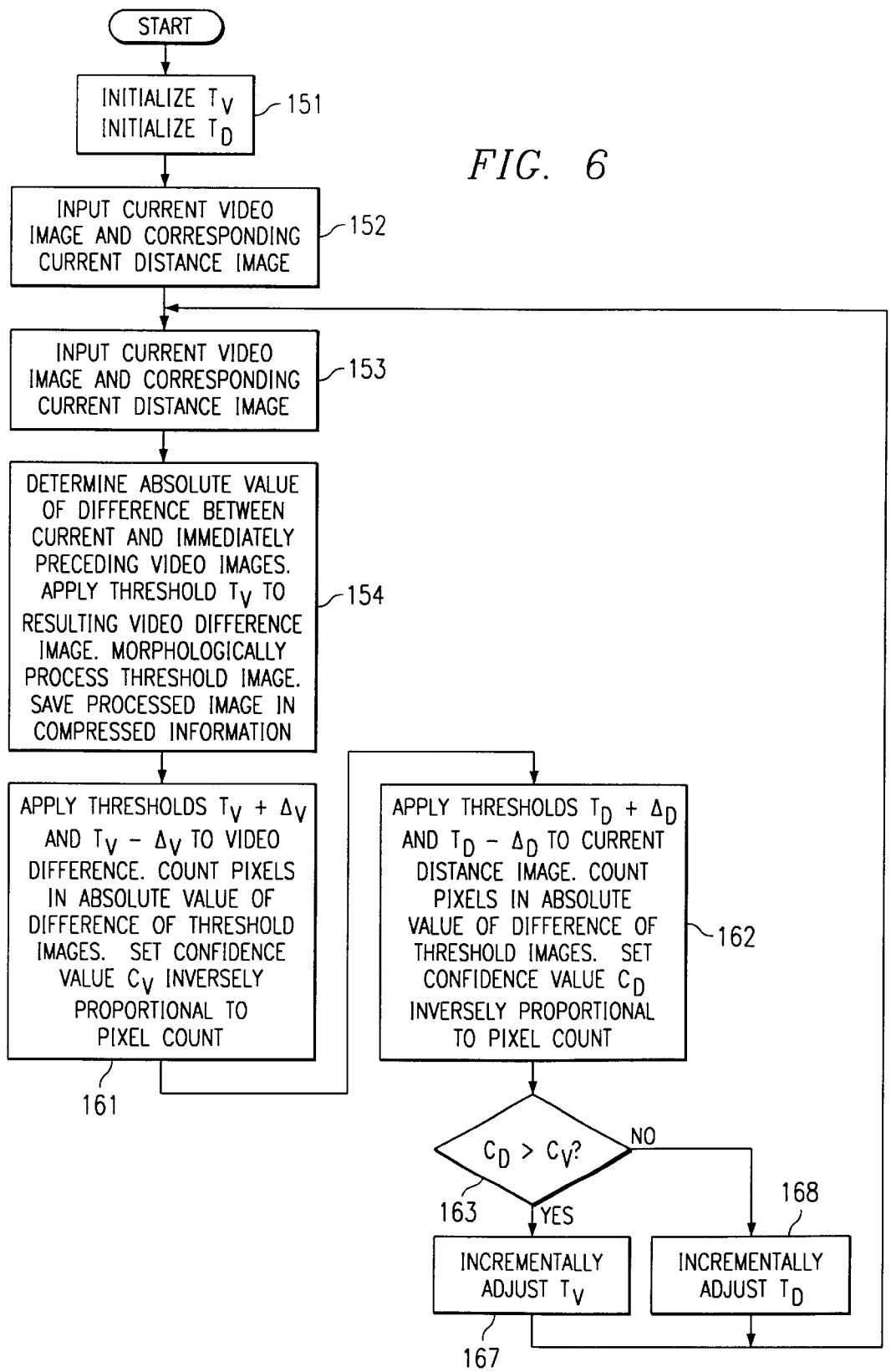
FIG. 6 is a flowchart depicting an image compression technique utilized in the system of FIG. 5.

In FIG. 6, the processing section 119 initializes variables $T_V$ and $T_D$ that respectively represent a video threshold and a distance threshold, so that each has a respective predetermined default value. Then, at block 152, the processing section 119 inputs a current video image and a corresponding current distance image. That is, the processing section 119 inputs respective images from the detectors 12 and 113 which were generated at approximately the same point in time. Then, at block 153, the processing section 119 does the same thing that it did at block 152, the images obtained at block 153 now being the current images, and the images obtained at block 152 being the immediately preceding images.

For convenience, it is assumed in this discussion that the current video images obtained at blocks 152 and 153 are each similar to the image of FIG. 2. It is further assumed, with reference to FIG. 2, that the person 31 is raising his right arm, but is otherwise remaining stationary. As mentioned above, the video detector 12 generates gray scale video images.

Figure 7:
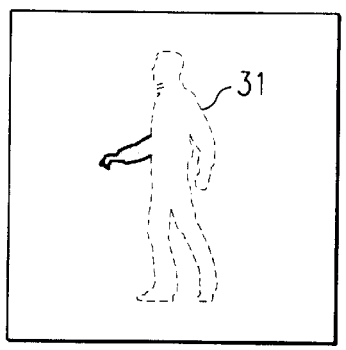
FIGS. 7 and 8 are diagrammatic views of two-dimensional images generated by the system of FIG. 5 during image processing according to the flowchart of FIG. 6.

At block 154, the processing section 119 subtracts the current video image from the immediately preceding video image, on a pixel-by-pixel basis. The absolute value of the difference for each pixel is then determined. The result will be a difference image similar to that shown in solid lines in FIG. 7. In FIG. 7, the broken lines are not part of the actual image, but instead are provided as a convenience in order to show the outline of the person 31 and thus put the solid lines in context. In FIG. 7, the darkest pixels appear along the upper and lower edges of the person's arm, where the most significant differences occur in the video images as a result of the motion of the arm. However, as also shown in FIG. 7, there may be some pixels of moderate darkness between the two solid lines. For example, the person may be wearing a plaid shirt, and the movement of the plaid pattern with the arm may produce some change regions which are detected but which are less pronounced than the change regions at the upper and lower edges of the arm.

Figure 8:
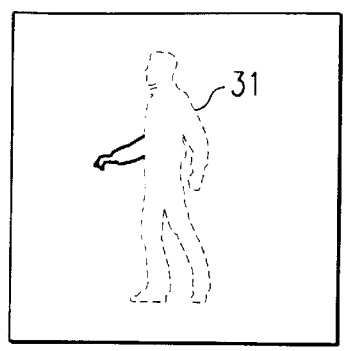

Then, still in block 154, the processing section 119 uses the video threshold value $T_V$ to threshold the difference image of FIG. 7, in order to obtain the threshold image which is shown in FIG. 8. In FIG. 8, it will be noted that the darkest pixels, located along the upper and lower edges of the arm, have been retained because their values are greater than that of the $T_V$ threshold, whereas the less pronounced pixels between the solid lines have been eliminated, because the values associated with these pixels were each less than the $T_V$ threshold. Depending on the value of the video threshold, pixels of intermediate darkness will be either eliminated or retained.

Then, still in block 154, the processing section 119 takes the video information corresponding to the solid lines in FIG. 8, which represents changes that have occurred between the current video image and the immediately preceding video image, and saves this change information in the storage section 21 as part of the compressed image information. Clearly, the amount of storage space needed to save an entire video image is substantially greater than that needed to save the change regions indicated by solid lines in FIG. 8. Thus, compression is achieved by extracting and saving only information representing the portions of the current video image which have changed since the immediately proceeding video image.

Thereafter, in order to fine tune the threshold operation described above in association with block 154 and FIGS. 7 and 8, the processing section 119 carries out the following steps. First, in block 161, the processing section 119 uses $T_V$ to derive two further thresholds $(T_V+\Delta_V)$ and $(T_V-\Delta_V)$, where $\Delta_V$ is an incremental constant. The processing section 119 then generates two additional threshold images by successively and separately applying these two derived thresholds to the video difference image which was generated in block 154, an example of which is shown in FIG. 7. The processing section 119 thereafter determines the absolute value of the difference of these two additional threshold images, on a pixel-by-pixel basis, and then counts the number of pixels in the resulting image which have a binary "1" state. The processing section 119 then uses this pixel count to set a video confidence value $C_V$ in a manner inversely proportional to the pixel count.

Stated differently, if the video threshold $T_V$ currently has a value which is highly effective in distinguishing regions of interest from regions which are not of interest, the images obtained with the derived thresholds, $(T_V+\Delta_V)$ and $(T_V-\Delta_V)$ will be substantially identical, representing a low pixel count and a high confidence level in the current value of $T_V$. In contrast, if the threshold $T_V$ currently has a value which is not highly effective, the images obtained with the two derived thresholds will differ more significantly from each other, resulting in a high pixel count and a lower confidence level. This is why the confidence value $C_V$ is set in inverse portion to the pixel count.

Then, at block 162, the processor uses the distance threshold $T_D$ and a different incremental constant $\Delta_D$ to calculate two further derived thresholds $(T_D+\Delta_D)$ and $(T_D-\Delta_D)$ These two derived distance thresholds are each applied to the current distance image in order to obtain two threshold distance images. The processing section 119 then determines the absolute value of the difference between these two threshold distance images, on a pixel-by-pixel basis, and counts the pixels in the resulting image. Then, the processing section 119 sets a distance confidence value $C_D$ in inverse proportion to the pixel count developed from the distance information.

At block 163, the processing section 119 compares the distance confidence value $C_D$ to the video confidence value $C_D$ in order to determine whether the video threshold $T_V$ or the distance threshold $T_D$ is currently associated with a higher level of confidence. The processing section 119 then adjusts whichever of these two thresholds currently has the lower level of confidence. More specifically, if $C_D$ is greater than $C_V$ at block 163, indicating that there is currently a lower confidence level in $T_V$ (the video threshold), the processing section 119 proceeds to block 167 and makes an incremental adjustment to the video threshold $T_V$. In particular, in block 167, the threshold $T_V$ will be adjusted either upwardly or downwardly by a small amount, depending on whether the pixel count developed from the image information was larger or smaller than the pixel count developed from the distance information. Alternatively, if it is determined that $C_V$ is greater than $C_D$ (at block 163), indicating that the distance threshold $T_V$ currently enjoys a higher level of confidence, then at block 168 the processing section 119 makes an incremental adjustment to $T_D$ (the distance threshold). That is, in block 168, the threshold $T_D$ will be adjusted either upwardly or downwardly by a small amount, depending on whether the pixel count developed from the distance information was larger or smaller than the pixel count developed from the image information.

From each of blocks 167 and 168, the processing section 119 proceeds back to block 153, to obtain the next video image and the next distance image from the detectors 12 and 113. The processing section thus repeatedly executes the loop represented by blocks 153–154, 161–163 and 167–168, so that one or both of the thresholds $T_V$ and $T_D$ are dynamically adjusted. Thus, the processing section 119 processes the video information from the image detector 12 as a function of the distance information from the image detector 113, in order to generate compressed image information which is saved in the storage section 21.

Figure 9:
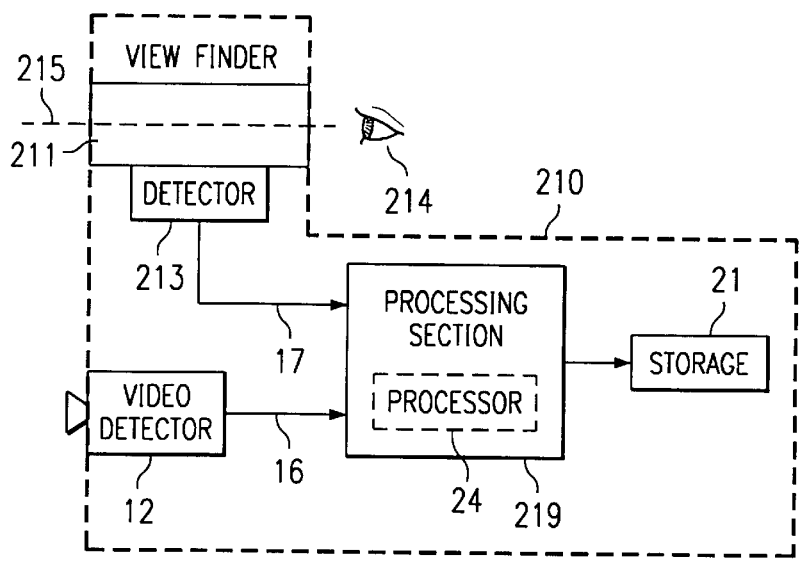
FIG. 9 is a diagrammatic view of a system which is a further alternative embodiment of the system of FIG. 1.

FIG. 9 is a diagrammatic view of a system 210 which is an alternative embodiment of the system 10 of FIG. 1. Elements of the system 210 which are equivalent to elements of the system 10 are identified with the same reference numerals, and only the differences are described in detail below.

In FIG. 9, the system 210 is a portable video camera system, and has a viewfinder 211 which an operator can use to observe a scene of interest that is being recorded by the video camera. The eye 214 of the operator looks through the viewfinder 211 along a line of sight 215. For the sake of example, it is assumed that the video camera system 210 is being held stationary, and is recording images of the same scene which is shown in FIG. 2. The eye 214 of the operator can move relative to the video camera system 210, so as to change the line of sight 215 within optical limits of the viewfinder 211. For example, with reference to FIGS. 2 and 9, the eye 214 may be oriented so that the line of sight 2is directed to the upper right corner of the image of FIG. 2, to the lower left corner of the image of FIG. 2, or to some other portion of the image of FIG. 2.

An eye-tracking detector 213 of a known type is operatively coupled to the viewfinder 211, and can detect a portion of the image to which the eye 214 of the operator is currently directed. The eye-tracking detector 213 supplies this information at 17 to a processing section 219. The processing section 219 differs from the processing section 19 of FIG. 1 with respect to the manner in which it uses supplemental information from the eye-tracking detector 213 to process video images from the video detector 12, in order to generate compressed image information which it stores in the storage section 21. The operation of the processing section 219 is described in more detail below.

Figure 10:
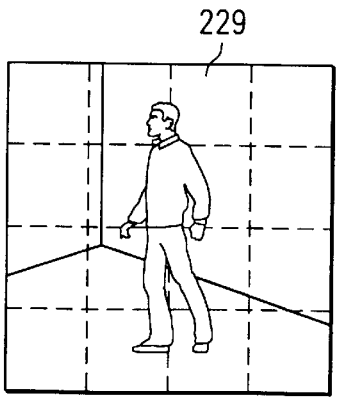
FIG. 10 is a diagrammatic view of a two-dimensional image generated by the system of FIG. 9 while effecting image compression.

More specifically, FIG. 10 is a diagrammatic view of the same image shown in FIG. 2, but with the addition of a grid of broken lines that divide the image into sixteen sections of equal size. The use of sixteen sections is merely for the sake of example, and a larger or smaller number of sections could be used. Certain known compression algorithms compress a video image by first dividing it into a number of sections, for example as depicted in FIG. 10, and then separately compressing each section. The algorithm has a quantization parameter, which can be separately set for each section, and which ultimately determines the number of bits used to represent video information from that section.

Typically, each complete image will be represented by a predetermined number of bits, but the manner in which those bits are allocated among the sections of the image are determined by how the quantization parameter is set for each section. Some algorithms attempt to analyze the video image itself, in an attempt to determine which portion of the video image may be more important, and then set the quantization parameter to be higher for those sections which are determined to be more important. In contrast, in the video camera system 210 of FIG. 9, the processing section 219 sets the quantization parameter for each section of an image based on supplemental information from an additional detector, namely the eye-tracking detector 213.

For example, if the eye-tracking detector 213 determines that the line of sight 215 of the eye 214 of the operator is directed toward the section 229 of the image of FIG. 10, then the processing section 219 sets the quantization parameter for the section 229 to be higher than the quantization parameter used for other sections of the image, so that the resulting compressed information has more bits allocated to the section 229 than to any other section. As a practical matter, the operator will typically be looking at the portion of the image which is of greatest interest, and thus a greater amount of information regarding this portion will be saved in the compressed information than for other portions, allowing this portion of the image to later be decompressed and reconstructed with greater accuracy than other portions of the image.

The present invention provides a number of technical advantages. One such technical advantage is the capability to identify an object of interest in an image so that, when compressing the image, more of the available bits in the compression information can be allocated to the object of interest than to other portions of the image. Alternatively, by saving less information (or no information) regarding portions of the image other than an object of interest, the overall amount of compression information can be reduced. A related advantage is that the performance of image compression can be improved in real time, for both storage and transmission of compressed information.

Although three embodiments have been illustrated and described in detail, it will be understood that there are still other variations which fall within the scope of the present invention. For example, the disclosed embodiments each have a primary image detector which outputs video images, but the primary detector could be some other type of detector. Similarly, the disclosed embodiments use various types of secondary detectors, such as an infrared detector, a distance detector, and an eye-tracking detector, but other types of existing detectors could alternatively be used. Further, the disclosed embodiments illustrate three different techniques for generating compressed information by processing image information from a primary detector as a function of information from a supplemental detector, but there are still other techniques through which it is possible to generate compressed image information by processing image information from a primary detector using supplemental information form a supplemental detector. Other substitutions and alterations are also possible without departing from the spirit and scope of the present invention, as defined by the following claims.

What is claimed is:

1. A method for compressing image information, comprising the steps of:

generating first image information regarding a selected scene using a first image detector;

generating second image information regarding the selected scene using a second image detector, the second image information being different from the first image information;

generating compressed information including the steps of:
processing the first image information using an image threshold in order to produce a sequence of threshold images, while dynamically adjusting the image threshold as a function of the second image information; and using the threshold images to generate the compressed information.

2. A method for compressing image information, comprising the steps of:

generating first image information regarding a selected scene using a first image detector;

generating second image information regarding the selected scene using a second image detector, the second image information being different from the first image information;

generating compressed information including the steps of:

processing the first image information using first image threshold to produce a sequence of first threshold images;

using the first threshold images to generate the compressed information;

processing the second image information using a second threshold to produce a sequence of second threshold images;

comparatively evaluating the first threshold images and the second threshold images; and modifying a selected one of the first image threshold and the second image threshold based on the outcome of said comparatively evaluating step.

* * * * *